United States Patent [19]

Takahata et al.

[11] 3,933,558
[45] Jan. 20, 1976

[54] METHOD OF PROCESSING LAMINATED DECORATIVE SHEET FOR IMPARTING PERMANENT SHAPE THERETO

[75] Inventors: Yasushi Takahata; Akira Karimori, both of Fuji; Toshiya Kato, Nagoya; Katsuo Nomura, Inuyama, all of Japan

[73] Assignees: Kohjin Co., Ltd., Tokyo; Aika Kogyo Co., Ltd., Aichi, both of Japan

[22] Filed: May 25, 1973

[21] Appl. No.: 364,186

[30] Foreign Application Priority Data

May 29, 1972  Japan............................... 47-52445

[52] U.S. Cl. .............. 156/209; 156/220; 156/222; 427/361; 427/370; 427/411; 428/172
[51] Int. Cl.² ...................... B31F 1/00; B44C 1/24
[58] Field of Search.................... 156/209, 220, 222; 117/76 P; 428/156, 161, 165, 172; 427/361, 370, 411

[56] References Cited
UNITED STATES PATENTS

| | | | |
|---|---|---|---|
| 2,537,126 | 1/1951 | Francis, Jr. ........................ | 156/220 |
| 3,257,252 | 6/1966 | Keel..................................... | 156/209 |
| 3,308,227 | 3/1967 | Power et al......................... | 156/220 |
| 3,311,520 | 3/1967 | Michaelson et al................. | 156/209 |
| 3,494,783 | 2/1970 | Kimura et al....................... | 117/76 P |
| 3,562,043 | 2/1971 | Eddy................................... | 156/209 |
| 3,674,619 | 7/1972 | Scher et al.......................... | 156/209 |
| 3,698,978 | 10/1972 | McQuade, Jr. ..................... | 156/222 |
| 3,761,338 | 9/1973 | Ungar, et al........................ | 156/209 |

*Primary Examiner*—Douglas J. Drummond
*Assistant Examiner*—Basil J. Lewris
*Attorney, Agent, or Firm*—Sughrue, Rothwell, Mion, Zinn & Macpeak

[57] ABSTRACT

A laminated decorative sheet is prepared by applying a coating layer consisting of a thermo-setting resin composition on a base paper for a decorative laminate which has been prepared by incorporating a composition the whole or a major part of which is composed of a synthetic rubber and/or a thermo-plastic synthetic resin substance into the base paper during the paper making thereof or by impregnating the base paper with the thermo-plastic synthetic resin composition or with the mixture thereof; or alternatively is prepared by laminating another base paper for a decorative laminate which has been impregnated with the thermosetting resin composition on the above mentioned base paper containing the thermo-plastic synthetic resin composition, and the thus prepared layers are laminated under heat and pressure to form a laminated decorative sheet having smooth surface which is subjected to emboss-processing under a heating condition of at least 100°C or more so as to impart a permanent shape to the laminated decorative sheet.

7 Claims, No Drawings

METHOD OF PROCESSING LAMINATED DECORATIVE SHEET FOR IMPARTING PERMANENT SHAPE THERETO

BACKGROUND OF THE INVENTION

1. Field of the Invention

This invention relates to a method of finishing a laminated decorative sheet for imparting thereto a permanent embossed shape wherein a laminated decorative sheet having surface properties similar to those of a laminated thermo-setting decorative sheet is in the first place once molded under heat and pressure by means of a method of using a flat smooth metal plate or of using a continuous molding machine consisting of rolls having plane surfaces and a steel band, without using any embossing metal plate or the like in the time of this molding under heat and pressure, and afterwards, the thus molded sheet is passed through heated embossing rolls under pressure, or alternatively, after the molded sheet has been preheated, the thus preheated sheet is passed through embossing rolls under pressure which have not been heated, whereby an embossed laminated decorative sheet having surface properties similar to those of an embossed thermo-setting decorative laminate may be prepared by post-finishing embossing method.

2. Description of the Prior Art

Various methods have hitherto been known for manufacturing laminated thermo-setting decorative sheets having embossed patterns where the desired patterns are imparted on the surfaces of the laminated sheets at the same time of molding the sheets under heat. These conventional techniques include, for example, a method of molding a laminating sheet under heat and pressure where engraved metal plates are used in the molding, a method where a thermo-setting resin is previously applied on or impregnated into an emboss patterned paper or fabric or the like and then is cured under heat, and thus prepared patterned plate which has been subjected to release-treatment is interposed between a smooth metal plate and the impregnated paper, and a method for transferring mesh patterns where a wire net, a fabric or the like is put on the impregnated paper after the wire net, etc. have been subjected to release-treatment, or otherwise via a releasing film between the wire net, etc. and the impregnated paper.

However, these conventional methods involve various defective problems. In particular, in the case of embossing metal plates, it is necessary to simultaneously mold a lot of sheets and therefore, a lot of embossing plates which are expensive must be prepared for the embossing. In the case of superposing a lot of rugged plates, the pressure is apt to become uneven. In the method of using patterned plates or other interposition matters, the steps are complicated and the range for selecting the desired patterns is limited. Moreover, when a post-finishing for imparting embossed patterns is tried to the laminated thermo-setting decorative sheet (or board) which has once been molded under heat and pressure and which has an even surface, by pressing the laminate with an embossing plate or by passing the same through embossing rolls, the embossing can hardly been attained and further cracks are often caused in the resulting laminate by the embossing treatment because of the fact that the core or the underlaid material (the plywood hard board, etc.) have already been pressed and contracted together with the surface layer of the laminate in the molding of the laminate and that the surface resin layer has already been cured.

SUMMARY OF THE INVENTION

The main object of the present invention is to eliminate the above mentioned defects.

Therefore, this invention provides an improved method of manufacturing embossed decorative laminates having surface properties similar to those of embossed thermo-setting decorative laminates which have been manufactured by using embossing plates and the like during the processing thereof under heat and pressure, and in more particular, the present invention provides a method of processing a laminated decorative sheet for imparting a permanent shape thereto characterized in that the smooth surface of the laminated decorative sheet is subjected to emboss-processing under a heating condition of at least 100°C or more so as to impart a permanent shape thereto; the laminated decorative sheet being prepared by applying a coating layer consisting of a thermosetting resin composition on a base paper for a decorative laminates which has been prepared by incorporating a composition the whole or a major part of which is composed of a synthetic rubber and/or a thermo-plastic synthetic resin substance into the base paper during the paper making thereof or by impregnating the base paper with the thermo-plastic synthetic resin composition or with the mixture thereof; or alternatively being prepared by laminating another base paper which has been impregnated with the thermo-setting resin composition on the above mentioned base paper containing the thermo-plastic synthetic resin composition.

In the method of the present invention, the surface properties of the laminated decorative sheet which are equal to those of laminated thermo-setting decorative sheet and the flexibility of the core thermo-plastic resin component are utilized, and the laminated decorative sheet having such properties and flexibility is passed through heated embossing rolls, or through not heated rolls while preheating the sheet thereby to impart an embossed permanent shape to the sheet by means of post-processing treatment.

DETAILED DESCRIPTION OF THE INVENTION

The method of the present invention is economically advantageous as compared with the conventional methods where the embossing treatment is carried out with the simultaneous molding of the sheet under heat and pressure and where a lot of embossing plates are required; in that any flat material may optionally and freely be embossed in the method of the present invention and thus the embossing step is very simple, and that the embossing operation may be continued for a long period of time by using only one embossing roll.

In the laminating of decorative sheets, a sheeting press machine may be used for molding plane boards, and in addition, another type of continuous pressure molding machine such as steel belt press may also be utilized for effectively and continuously molding long-sized sheets. In one embodiment of the present invention, the continuous molding machine and an embossing roller may be disposed in series whereby the molding and the embossing can continuously be carried out in the form of a continuous sheet while the sheet passes through the machine and roller in series. This continuous molding and embossing operation is very preferable. It is possible to carry out the embossing treatment during the simultaneous pressing operation so long as embossed patterns are given on the press surface of rolls, etc. or patterned plates or the like are interposed. However, these are economically defective and disadvantageous in view of operation efficiency, as compared with the method of the present invention, and moreover, the pressure is difficultly imparted as compared with the use of plane plate, and thus there is a serious problem that the embossing is insufficient.

According to the method of the present invention, the sheet which has once been molded under determined conditions is used in the embossing operation, and thus the degree of the embossing may freely and optionally be controlled by adjusting the pressure of the embossing roll, etc. Thus, the present method is very advantageous in that the operation control may very freely be performed. The materials to be used in the processing method of the present invention are suitably laminated decorative sheets.

The laminated decorative sheet is composed with two layers, one of which is a surface layer which is laminated on another layer or a support layer. A thermo-setting resin is applied to a base paper or mixed with a pigment to form a sheet or coating layer as a surface layer. The composition mainly consist of synthetic rubber or thermo-plastic resin is applied to a base paper to form a support layer. The above mentioned base papers are porous, absorptive, wet-strengthened and can be loaded with titanium-oxide or other filler and/or pigment to impart desired color and opacity.

As the raw materials of the layers are mentioned a synthetic rubber or a thermo-plastic resin or a mixture thereof with a small proportion of a thermo-setting resin, for example, a synthetic rubber latex such as styrene-butadiene copolymer, acrylonitrile-butadiene copolymer, etc., or a synthetic resin emulsion such as vinyl acetate, polyvinyl chloride, polyacrylate, etc. The thermo-setting resin to be added to the synthetic rubber and/or thermo-plastic resin in a small proportion is selected from precondensation products of melamine resins, urea resins, phenol resins, etc. The above mentioned resins are applied to a carrier base such as a base paper for a laminated thermo-setting decorative sheet, etc. by means of coating, impregnation, wetend-addition etc. to form a support layer, and on the thus formed support layer is superposed another carrier base such as the above mentioned base paper to which has been applied a thermo-setting resin such as, for example, diallyl phthalate resin, benzoguanamine resin, unsaturated polyester resin including alkyd resin, etc., from these resins the good post-formable resin composition may be preferably selected, or otherwise, a mixture of the thermo-setting resin and a pigment is applied on the support layer, to form a surface layer, and afterwards, the thus composed two layers are heated and pressed to cure the thermo-setting resin on the surface of the layer while the two layers are simultaneously integrally bonded together to form an integrated sheet. The thus prepared laminated decorative sheet is a flexible sheet having an excellent hiding property, and an embossed decorative laminate may be manufactured therefrom after the post-embossing thereof, having surface properties similar to those of a laminated thermo-setting decorative sheet.

The above mentioned laminated decorative sheet is suitable for the method of the present invention in that the sheet has good flexibility and that the surface properties thereof are equal to those of a laminated thermo-setting decorative sheet. It has been found from the related experiments that the laminated decorative sheet may be embossed by using an embossing plate or an embossing roll under re-heating, although the surface resin of the sheet has already been hardened due to heat and pressure.

In the embossing procedure, the heating may be conducted by pre-heating the embossing plate or the embossing roll, or otherwise the pre-heated sheet may be embossed under cooling.

The heating temperature is preferably 100°C or more, and it is necessary that the thermo-plastic resin of the laminated decorative sheet supporting layer (baking layer) is softened by heating. The upper limit of the heating temperature may freely be selected in such range that the thermo-plastic resin does not flow out to cling to the roll or the base paper and the resin are not deteriorated, and in general, the temperature may be up to 200°C or so, preferably 150° ~ 180°C, depending upon the kind of the used resin. The roll pressure is 10 kg/cm² or more, preferably 20 kg/cm² or more.

The embossing roll is suitably composed of a metal roll having embossed or etched patterns and a rubber roll or a paper roll. In the case of embossing by means of plate pressing, the sheet is pressed between a metal plate having embossed patterns and a cushion material. It has hitherto been impossible to emboss a laminated thermo-setting decorative sheet by means of a post-processing operation using a plate press. Under such circumstances, the present invention also is very advantageous in that the post-embossing with a plate press has become possible for the first time by using the above mentioned laminated decorative sheet of the present invention.

Now, the present invention will be explained more in detail by the following examples, which, however, do not whatsoever limit the scope of the present invention.

EXAMPLE 1

A colored base paper weighing 80 g/m² was impregnated with a solution mainly composed of benzoguanamine resin in a solid amount of 95 g/m² loaded to the paper, to prepare an impregnated paper which was used as a surface layer. Apart from this, another colored base paper weighing 80 g/m² was impregnated with a solution consisting of 100 parts of styrene-butadiene copolymer latex and 4 parts of melamine-formaldehyde resin in a solid amount of 25 g/m², to prepare another impregnated paper to serve as a backing layer. The two layers were molded together under plate pressure and heat and under the following molding conditions to form a laminated sheet: Temperature, 150°C; pressure 15 kg/cm, time, 7 minutes.

The thus prepared laminated decorative sheet was passed through embossing rolls heated at 180°C under the pressure of 25 kg/cm² at a speed of 5 m/min to obtain an embossed laminated decorative sheet. The thus embossed sheet was sticked on a plywood by using a vinyl acetate adhesive to obtain a decorated board having the properties as shown in the No. 1 of the following Table and having the necessary quality required as a board laminated with thermo-setting decorative sheet.

EXAMPLE 2

A base paper printed with grain patterns and weighing 55 g/m² was impregnated with a solution consisting of 80 parts of diallyl phthalate resin, 20 parts of polyester resin, 3 parts of benzoyl peroxide and a small amount of releasing agent, etc. in a solid amount of 65 g/m² to form a surface layer, and a white base paper weighing 80 g/m² was impregnated with a solution consisting of 50 parts of acrylonitrile-butadiene copolymer latex and 50 parts of natural rubber latex in a solid amount of 25 g/m² to form a backing layer. Afterwards, the two layers were molded together under plate pressure and heat and under the following molding conditions: Temperature, 130°C; pressure, 10 kg/cm²; time, 5 minutes.

The thus prepared laminated decorative sheet was pre-heated up to 160°C by using an ultrared heater, and was passed between an embossing steel roll having engraved grain patterns and a rubber roll at a speed of 7 m/min and under an embossing pressure of 30 kg/cm² whereby a laminated decorative sheet having embossed grain patterns was obtained. The thus obtained sheet was sticked on a particle board by using a chloroprene adhesive to prepare a decorative board. The properties of the prepared decorative board are shown in the No. 2 of the following Table, and this board had the necessary character as a board laminated with thermo-setting decorative sheet.

EXAMPLE 3

The two impregnated papers for the surface layer and the backing layer of the laminated decorative sheet of the Example 2 were continuously molded in the form of a long-sized sheet as such, by using a steel belt type continuous molding machine at a temperature of 160°C, under a pressure of 6 kg/cm² and for a molding time of 3 minutes, and the molded sheet forwarded out of the molding machine was successively continuously passed, without reeling the same, between an embossing roll heated at 160°C and a rubber roll under the pressure of 30 kg/cm², whereby a decorative laminate embossed with grain patterns was obtained. The thus prepared long-sized sheet could be wound in the form of a roll as such. The sheet was cut in a desired size and was sticked on a particle board by using a chloroprene adhesive to obtain a decorative board. The properties of the thus obtained decorative board are shown in the No. 3 of the following Table, and this board had the necessary surface properties as a laminated thermo-setting decorative sheet.

EXAMPLE 4

A colored base paper (of pale orange) weighing 80 g/m² which was made from 100 parts of pulp, 0.1 part of insoluble red azo pigment and 0.2 part of high molecular yellow azo pigment was impregnated with an acetone solution of diallyl phthalate resin (containing 3 percent on the basis of the resin of benzoyl peroxide and a small amount of additive such as an inner releasing agent) in a solid amount of 180 g/m², and was evaporated the solvent under a mild heating condition to form the impregnated paper serving as a surface layer.

A colored base paper (weight: 100 g/m²) of low density and high water absorption containing titanium oxide and colored similarly to the above mentioned surface layer paper was impregnated with methyl methacrylate-butadiene copolymer emulsion in a solid amount of 43 g/m², and was dried to form an impregnated paper serving as a backing layer.

The above mentioned surface layer and backing layer were laminated and molded with plate press and heat under the molding conditions of 130°C, 10 kg/cm² and 7 minutes, whereby a single-colored decorative laminate having high hiding property and high saturation was obtained. The single-colored laminate decorative sheet was passed between an embossing steel roll having engraved flowery patterns and heated at 180°C and a paper roll at a speed of 10 m/min. The embossing pressure imparted to the fancy sheet in this embossing operation was 20 kg/cm². In the laminated decorative sheet passed through the rolls was beautifully transferred the flowery emboss patterns of the embossing roll. The thus embossed sheet was sticked on a hard board by using a vinyl acetate adhesive to obtain an embossed decorative board. The surface properties of the thus prepared decorative board are shown in the No. 4 of the following Table, and this board had the necessary quality as a laminated thermo-setting decorative board.

EXAMPLE 5

The impregnated papers of surface layer and backing layer of the laminated decorative sheet of the Example 4 were continuously molded in the form of a long-sized sheet as such by using a steel belt press type continuous processing and molding machine under the conditions of 170°C, 4 kg/cm² and 2 minutes to form a molded sheet. Afterwards, the thus molded sheet was successively and continuously passed, without reeling the same, through the same embossing roll as in the Example 4 under the conditions of 180°C and 20 kg/cm², whereby an embossed decorative laminate was continuously obtained.

The thus prepared sheet was sticked on a hard board by means of roll press and by using a vinyl acetate adhesive to obtain a decorative board covered with embossed decorative laminate having a single-color of high saturation. The properties of the resulting board are shown in the No. 5 of the following Table, and this board had the necessary quality as a laminated thermo-setting decorative board.

EXAMPLE 6

A white base paper (weight: 100 g/m²) of low density, high water absorption and high hiding ability was impregnated with a solution consisting of 50 parts of styrene-butadiene copolymer emulsion and 50 parts of vinyl acetate resin emulsion in a solid amount of 34 g/m² and dried to form a support base.

50 parts of diallyl phthalate prepolymer, 13 parts of polyester resin and a small amount of additives such as releasing agent, etc. were dissolved in 85 parts of acetone. In this resin solution were added 55 parts of titanium oxide and 7 parts of blue pigment, and the whole was well dispersed by using a homo-mixer. In the next place, 1.7 parts of benzoyl peroxide were added to the resulting dispersion to prepare a coating solution. The coating solution was applied to the above mentioned support base in a solid amount of 80 g/m², and was subjected to drying with a hot air of 80° ~ 90°C to prepare a sheet. The thus prepared sheet was molded by using a duralmin plate embossed with geometrical patterns under the molding conditions of plain plate pressing, 130°C, 13 kg/cm² and 7 minutes, whereby a decorative laminate having good flexibility, excellent hiding property, high saturation and relief effect was obtained. The decorative laminate was sticked on a plywood by using a vinyl acetate adhesive, and the properties of the resulting decorative board are shown in the No. 6 of the following Table.

In place of the molding with the embossing plate, the molding and the embossing were successively and continuously carried out according to a continuous one-step method, by using a continuous type molding and embossing machine composed of combined steel belt type continuous molding machine and roll embosser, under the molding conditions of 160°C, 4 kg/cm² and 3 minutes and the embossing conditions of 180°C and 20 kg/cm². The appearance of the resulting embossed laminated decorative sheet was same as that of the laminated decorative sheet prepared by using the embossing plate press.

The thus prepared sheet was sticked on a plywood by using a vinyl acetate adhesive, and the properties of the resulting board are shown in the No. 7 of the following Table. This board had the necessary quality required in a thermo-setting decorative board as shown in the Table.

EXAMPLE 7

80 parts of pulp was dispersed in water to prepare a dispersion of 3 ~ 4 percent concentration. In the next place, 5 parts of titanium oxide were added to the resulting dispersion in the form of a water dispersion of 25 percent concentration, and in addition, a vinyl acetate resin emulsion of 30 percent concentration was added thereto in an amount of 25 parts of solid content and the whole was uniformly admixed. To the solution mixture was added alum to fix the titanium oxide and the vinyl acetate resin so as to make a paper, whereby a paper containing vinyl acetate resin (weight: 100 g/m², thickness: 0.13 mm) was obtained, serving as a backing layer.

A base paper printed with grain patterns and weighing 55 g/m² was impregnated with a solution consisting of 80 parts of diallyl phthalate resin, 20 parts of polyester resin, 3 parts of benzoyl peroxide paste and a small amount of releasing agent, etc., in a solid amount of 65 g/m² to prepare a surface layer sheet. The two layers were molded under heat and pressure and under the following molding conditions to prepare a smooth laminated sheet: Temperature, 130°C; pressure, 10 kg/cm²; time, 5 minutes.

The resulting laminated sheet was passed through an embossing roll having engraved grain patterns and heated at 160°C under the pressure of 30 kg/cm² and at a speed of 7 m/min, whereby a decorative laminate having embossed grain patterns was obtained. The thus obtained decorative laminate was sticked to a water-proofing plywood by using a phenol resin adhesive, and the properties of the resulting board are shown in the No. 8 of the following Table. As seen therein, the board had the necessary quality required as a laminated thermo-setting decorative sheet.

Table

| example No. | 1 | 2 | 3 | 4 | 5 | 6 | 7 | 8 |
|---|---|---|---|---|---|---|---|---|
| immersion in boiling water (2 hours) | ←———— no change on surface condition ————→ | | | | | | | |
| | ←———— no delamination ————→ | | | | | | | |
| resistance of surface to heat (180°C) | ←———— no defect on surface ————→ | | | | | | | |
| resistance of surface to stains* | ←——— n,k  c, f, g, i, j (no change) ———→ | | | | | | | |
| | ←——(no change)   k, n (slightly changed)——→ | | | | | | | |
| weight loss by Taber abrasor (mg/100 cycle) | 0.07 | 0.07 | 0.1 | 0.09 | 0.1 | 0.08 | 0.08 | 0.1 |
| immersion in water (25°C, 4 days) | ←———— no change on appearance ————→ | | | | | | | |
| heat cracking resistance (80°C, 48 hours) | ←———— no change ————→ | | | | | | | |

*test reagent: n, ink; k, crayon; c, milk; f, 10% citric acid g, gasoline; j, 10% ammonia; i, olive oil While the invention has been described in detail and with reference to specific embodiments thereof, it will be apparent to one skilled in the art that various changes and modifications can be made therein without departing from the spirit and scope thereof.

What is claimed is:

1. A method of processing a laminated decorative sheet composed of two layers comprising a surface layer and a support layer for imparting a permanent shape thereto, which comprises the steps of:

a. preparing a support layer by impregnating a first base paper with a synthetic rubber latex and/or a synthetic resin emulsion selected from the group consisting of styrene-butadiene copolymer, acrylonitrilebutadiene copolymer, methyl methacrylate-butadiene copolymer, polyvinyl acetate, polyvinyl chloride, polyacrylate and mixtures thereof; or by incorporating said synthetic rubber latex and/or said synthetic resin emulsion into a pulp slurry for the base paper by wet end addition, wherein said support layer contains the synthetic rubber and/or synthetic resin emulsion in an amount of at least 22.72 percent by weight;

b. preparing a surface layer by impregnating a second base paper with a thermosetting resin selected from the group consisting of diallyl phthalate resin, benzoguanamine resin, unsaturated polyester resin and mixtures thereof; or by coating said thermosetting resin on the support layer obtained in a) above, the thickness of said surface layer being such that the laminate is flexible and capable of being embossed at pressures as low as 10 kg/cm²;

c. laminating said surface layer and said support layer at a temperature of from 100° to 200°C under a pressure of from about 4 to about 15 kg/cm² to cure the thermosetting resin in said surface layer and thereby obtain a laminated decorative sheet; and d. embossing the laminated decorative sheet using a plane sheet embossing press under the following conditions: temperature within the range of 100°C to 200°C and pressure within the range of 10 kg/cm² to 13 kg/cm²; or embossing the laminated decorative sheet using a roll embosser under the following conditions: temperature within the range of 100°C to 200°C, and pressure within the range of 10 kg/cm to 30 kg/cm.

2. The method as claimed in claim 1 wherein said mixture of synthetic rubber latex and/or synthetic resin emulsion further contains a small amount of thermosetting resin selected from the group consisting of melamine resin, urea resin, phenol resin and mixtures thereof.

3. The method as claimed in claim 1, wherein said laminated decorative sheet is prepared and embossed by one pass processing through tandem combined continuous press machine and embossing rolls.

4. The method as claimed in claim 1 wherein said laminated decorative sheet is prepared by laminating with a plane plate press under a pressure of from 4 to 15 kg/cm².

5. The method as claimed in claim 1 wherein said decorative sheet is prepared by laminating with a belt press under a pressure of from 4 to 6 kg/cm².

6. The method as claimed in claim 1 wherein said support layer contains the synthetic rubber and/or synthetic resin emulsion in an amount of 22.72 to 30.06 percent by weight, and where the thermosetting resin impregnated paper as said surface layer contains the thermosetting resin in an amount of 54.16 to 69.23 percent by weight.

7. The method as claimed in claim 1 wherein in step (b) said thermosetting resin coated on the support layer obtained in (a) contains a pigment.

* * * * *